(12) United States Patent
Jeong

(10) Patent No.: US 6,373,808 B1
(45) Date of Patent: Apr. 16, 2002

(54) OPTICAL PICK-UP APPARATUS CAPABLE OF ELIMINATING A CROSS-TALK COMPONENT FROM ADJACENT TRACKS

(75) Inventor: Seong Yun Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/414,529

(22) Filed: Oct. 8, 1999

(51) Int. Cl.$^7$ ................................. G11B 7/00

(52) U.S. Cl. ............................... 369/112.18

(58) Field of Search ............ 369/110.01, 110.02, 369/110.03, 110.04, 112.03, 112.05, 112.06, 112.07, 112.11, 112.12, 112.16, 112.17, 112.18, 112.19

(56) References Cited

U.S. PATENT DOCUMENTS 5,519,685 A * 5/1996 Kato et al. ............ 369/44.37 X

* cited by examiner

Primary Examiner—Paul W. Huber
(74) Attorney, Agent, or Firm—Birch, Stewart, Kolasch & Birch, LLP

(57) ABSTRACT

An optical pickup apparatus that is capable of eliminating a crosstalk component effectively. In the apparatus, a sub-beam for eliminating a crosstalk component is produced by utilizing a polarizing phase plate. The polarizing phase plate is provided with at least two phase zones with a different phase at each side on a basis of the center thereof. According to the apparatus, a position of the sub-beam is easily controlled in accordance with a track pitch of the optical disc by utilizing the polarizing phase plate consisting of a plurality of phase zones, thereby eliminating a crosstalk component optimally.

10 Claims, 4 Drawing Sheets

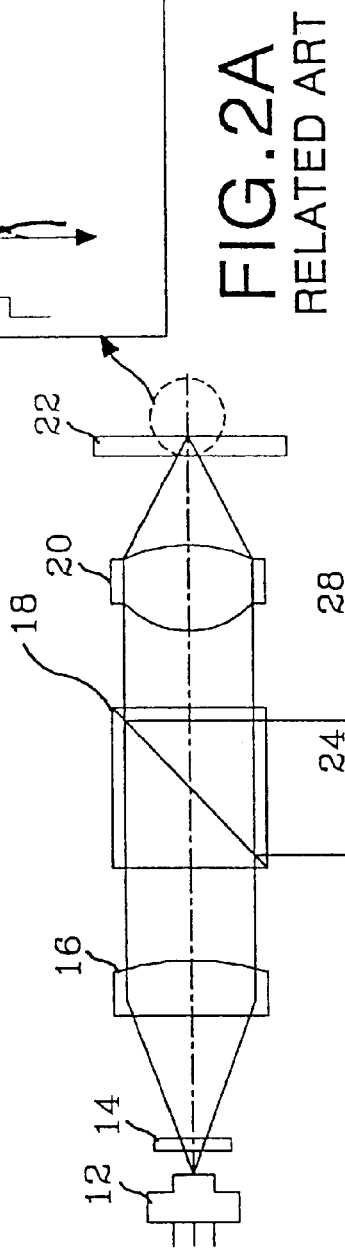
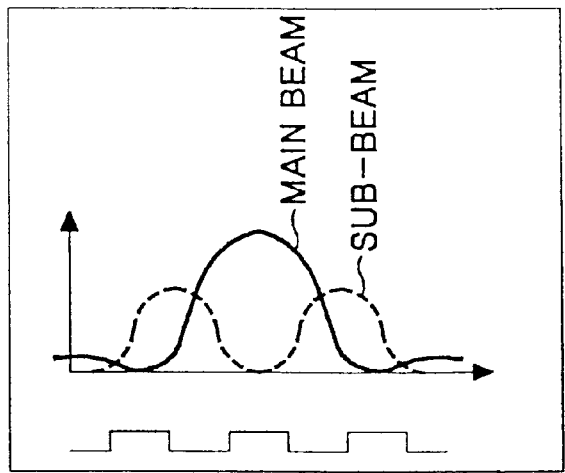
FIG. 2
RELATED ART
FIG. 2A
RELATED ART

OPTICAL PICK-UP APPARATUS CAPABLE OF ELIMINATING A CROSS-TALK COMPONENT FROM ADJACENT TRACKS

BACKGROUND OF THE INVENTION

1. Field of the Invention

This invention relates to an optical pickup apparatus used for recording and reproducing an optical disc, and more particularly to an optical pickup apparatus that is capable of eliminating the crosstalk effectively.

2. Description of the Prior Art

Generally, an optical pickup apparatus irradiates a light on the recording face of an optical disc to detect the reflected light, thereby performing the information recording and reproducing operation. To this end, the optical pickup apparatus is composed of a laser diode for emitting a light, an objective lens for focusing the emitted light on the recording face of the disc, and other optical system components required for concentrating and receiving the light.

An optical disc, such as a compact disc(CD) or a digital versatile disc(DVD) having more improved recording capacity, has been commercially available. This optical disc has wider use for recording and reproducing audio and video data and computer data, etc. Recently, an optical disc having much more improved recording capacity is expected owing to the development of a blue laser generating a short wavelength of light. There have been suggested several schemes for increasing the numerical aperture(NA) of an objective lens or narrowing the track pitch along with the use of a light source such as a blue laser, etc. so as to enlarge the recording capacity of the optical disc. However, it has a problem in that cross talk is caused between the adjacent tracks when there is narrowing of the track pitch of the optical disc.

More specifically, since an optical spot irradiated so as to reproduce a certain pit P1, it has a greater width than a width of the pit shown in FIG. 1, and it is also irradiated onto the pits in the adjacent tracks. As a result, a cross talk component caused by the pits in the adjacent tracks is involved in the reproduced signal. A strategy employing a polarizing phase plate as shown in FIG. 2 has been known as one of the methods used for eliminating such a cross talk component.

FIG. 2 shows the conventional optical pickup apparatus for eliminating the cross talk component. In FIG. 2, the optical pickup apparatus includes a light source 12 for generating a light beam, an objective lens 20 for focusing a light beam from the light source 12 on the recording face of an optical disc 22, first and second photo detectors 26 and 28 for converting a reflective light beam from the optical disc 22 into an electrical signal, a beam splitter 18 arranged among the light source 12, the objective lens 20 and the first and second photo detectors 26 and 28, a polarizing beam splitter(PSB) arranged among the beam splitter 18 and the first and second photo detector 26 and 28, a polarizing phase plate 14 arranged between the light source 12 and the beam splitter 18, and a collimator lens 16 arranged between the polarizing phase plate 14 and the beam splitter 18. The light source 12 generates two polarized beams having a polarizing characteristic moving perpendicularly to each other. The collimator lens 16 converts a divergent light beam progressing from the light source 12, via the polarizing phase plate 14, toward the beam splitter 18 into a parallel light beam to prevent leakage of the light beam. The beam splitter 18 passes a light beam from the collimator lens 16 in such a manner as to be progressed toward the objective lens 20, and reflects a reflective light beam reflected from the recording face of the optical disc 22, and passing through the objective lens 20 in such a manner as to be progressed toward the PSB 24. The objective lens 20 focuses an incident light beam from the beam splitter 18 on the recording face of the optical disc 22. The polarizing phase plate 14 consists of two phase segments(0, π) having a phase difference of 180° in the left and right phases thereof as shown in FIG. 3A, and which is responsible for selectively changing a phase of the light beam from the light source 12 in accordance with a polarizing characteristic thereof. More specifically, the polarizing phase plate 14 passes the first polarized beam in any one direction of two polarized beams emitted from the light source 12 as it is, thereby allowing the first polarized beam to be irradiated, via the collimator lens 16, the beam splitter 18 and the objective lens, on the recording face of the optical disc 22 as a main beam as shown in FIG. 2A. On the other hand, the polarizing phase plate 14 passes the second polarized beam in a direction perpendicular to the first polarized beam of two beams from the light source 12 with a phase being modulated, thereby allowing the second polarized beam to be irradiated on the recording face of the optical disc 22 as a sub-beam having a double-mountain shape superposed at each side of the main beam as shown in FIG. 2A. The main beam in the light beams irradiated on the recording face of the optical disc 22 in this manner is irradiated on the signal track to be accessed and is used to reproduce an information signal. On the other hand, the sub-beam is irradiated on the adjacent tracks and is used to detect a cross talk component included in the reproduced signal. The PSB 24 passes the main beam in a reflective light beam reflected from the disc 22 and received via the objective lens 20 and the beam splitter 18 as it is in such a manner to be progressed toward the first photo detector 26, whereas it reflects the sub-beam in such a manner to be progressed toward the second photo detector 28. The first photo detector 26 detects a main beam received from the PSB 24 and detects a sub-beam received from the PSB 24, thereby converting them into electrical signals. In other words, the first photo detector 26 detects a radio frequency signal including an information signal from the main beam while the second photo detector 28 detects a cross talk component in the adjacent tracks from the sub-beam.

Further, the optical pickup apparatus includes an amplifier 30 connected to the second photo detector 28, and a differential amplifier 32 connected to the first photo detector 26 and the amplifier 30. The amplifier 30 amplifies and outputs a crosstalk component in the second photo detector 28, and the differential amplifier 32 eliminates and outputs a crosstalk component output from the amplifier 30 from a radio frequency signal output from the first photo detector 26.

The optical pickup apparatus must have the ability to vary a distance between the sub-beams irradiated on the adjacent tracks so as to access all of the optical discs having a different track pitch accurately. In the above mentioned optical pickup apparatus, however, a degree of freedom for its design is deteriorated because a wavelength($\lambda$) of a beam determining a distance between the sub-beams or the numerical aperture(NA) of the objective lens must be controlled such that the distance between the sub-beams can be controlled.

More specifically, assuming that a distance extending from the center of the double-mountain shaped sub-beam as shown in FIG. 3B into a peak thereof, that is, a position of the sub-beam should be x, x is equal to $f\sin\theta$(wherein f is a focus length of the objective lens, and $\theta$ is an angle at which a line linking the sub-beam with the center of the objective lens makes an optical axis of the objective lens). Also, assuming that a diameter of the objective lens is a and a wavelength of a beam be λ, asinθ is equal to λ when considering the diffraction equation. In consideration of said relationship, a position value(x) of the sub-beam can be derived from the following equation:

$$X = f\frac{\lambda}{a} = \frac{\lambda}{2NA} \qquad (1)$$

wherein f is a focus length of the objective lens, a is a diameter of the objective lens, λ is a wavelength of the beam, and NA is the numerical aperture of the objective lens. It can be seen from the equation (1) that a position value(x) of the sub-beam is dependent only upon the numerical aperture NA and a wavelength(λ) of the beam. For instance, when a wavelength(λ) of the beam is 650 nm and the numerical aperture NA of the objective lens is 0.6, X becomes equal to 0.54 μm.

In order to eliminate a cross talk component and optimally taking advantage of the sub-beam, however, a position value(x) of the sub-beam must be controlled in accordance with a track pitch P of the optical disc. In other words, since the track pitches P defined at each disc are different from each other even when the disc belongs to a disc series to which the same wavelength and the same numerical aperture are applicable, a cross talk component can not be optimally eliminated until a position value(x) of the sub-beam is adaptively controlled in accordance with the track pitch P. In the optical pickup apparatus as shown in FIG. 2, however, a wavelength(λ) of the beam or the numerical aperture NA of the objective lens must be controlled so as to control a position value(x) of the sub-beam in correspondence with a track pitch of the disc, so that a degree of freedom for its design is deteriorated. Thus, it is necessary to provide an optical pickup apparatus that is capable of accurately locating the sub-beam at such a position that a cross talk can be optimally eliminated in accordance with the track pitch P.

SUMMARY OF THE INVENTION

Accordingly, it is an object of the present invention to provide an optical pickup apparatus that is capable of accurately locating a sub-beam at such a position that a crosstalk component can be effectively eliminated.

Further object of the present invention is to provide an optical pickup apparatus that is capable of eliminating a crosstalk component in compliance with various track pitches easily.

In order to achieve these and other objects of the invention, an optical pickup apparatus according to one aspect of the present invention produces a sub-beam for eliminating a crosstalk component by utilizing a polarizing phase plate which includes at least two phase zones with a different phase at each side on a basis of the center thereof.

BRIEF DESCRIPTION OF THE DRAWINGS

These and other objects of the invention will be apparent from the following detailed description of the embodiments of the present invention with reference to the accompanying drawings, in which: FIG. 2 and FIG. 2A are schematic view showing the configuration of a conventional optical pickup apparatus.

DETAILED DESCRIPTION OF THE PREFERRED EMBODIMENT

Figure 1:
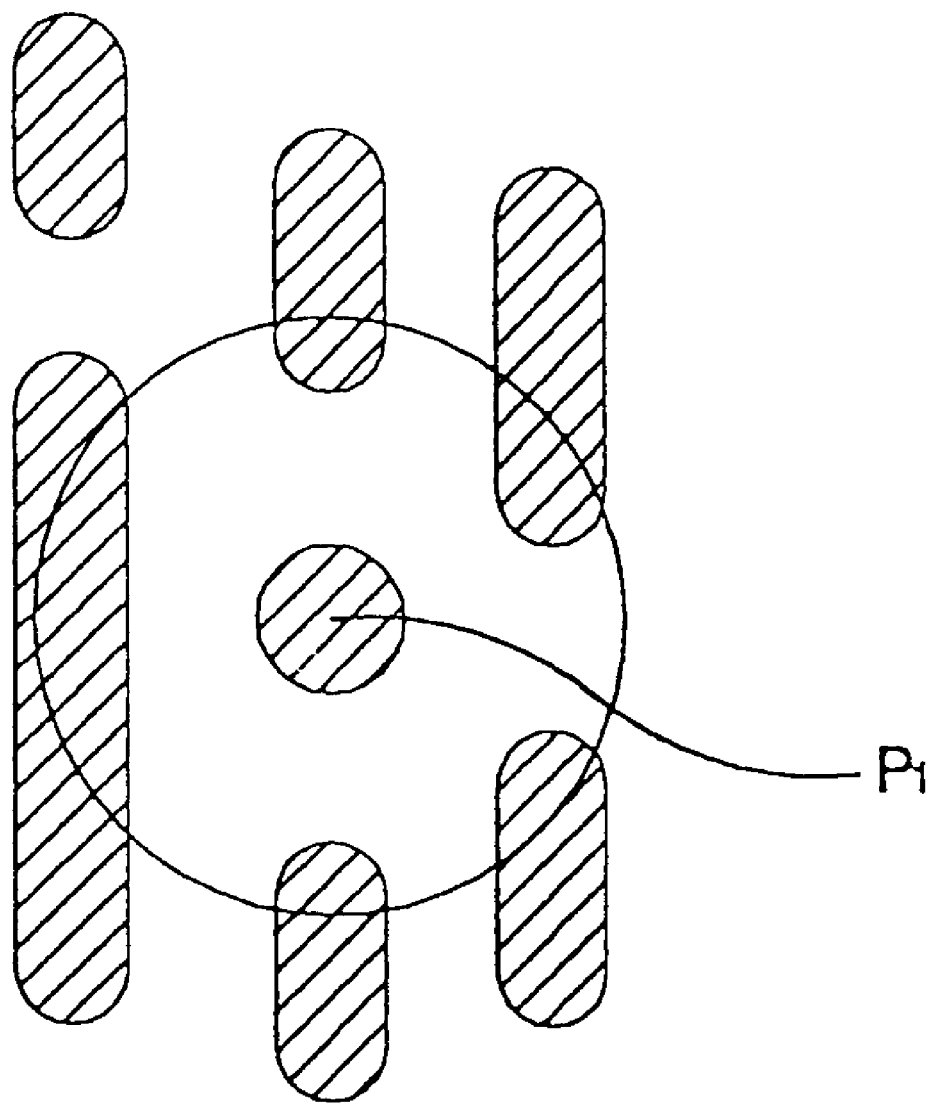
FIG. 1 is a view showing a crosstalk phenomenon.
Figure 3A:
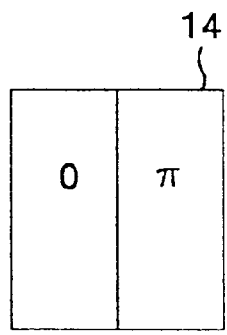
FIG. 3A and FIG. 3B show the structure of the polarizing phase plate in FIG. 2 and a shape of a sub-beam from it, respectively.
Figure 3B:
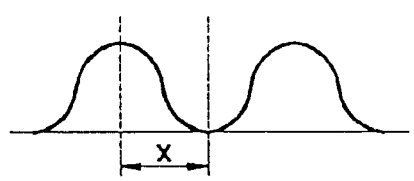
Figure 4:
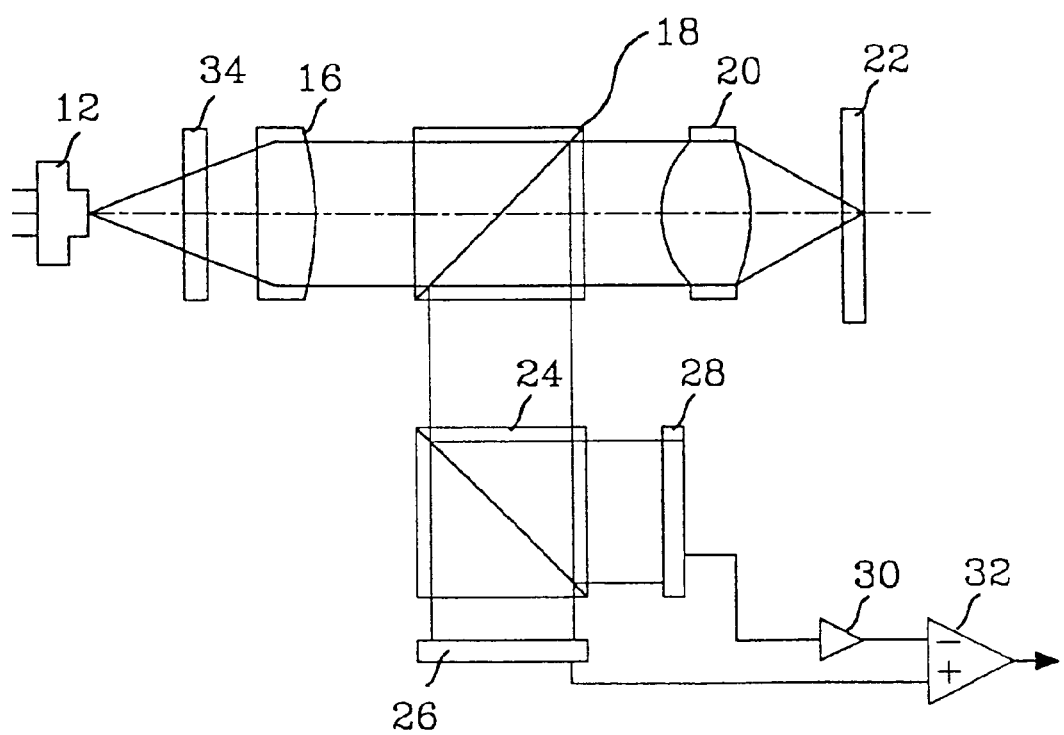
FIG. 4 is a schematic view showing the configuration of an optical pickup apparatus according to an embodiment of the present invention.
Figure 5:
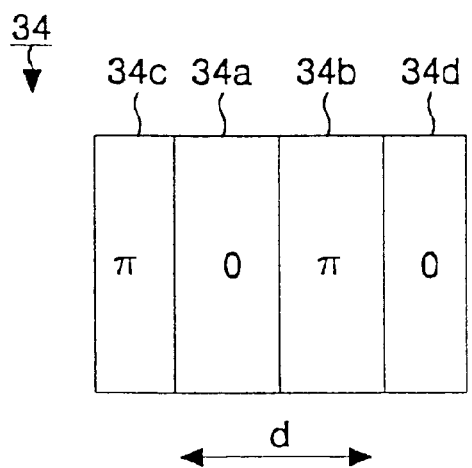
FIG. 5 shows a structure of the polarizing phase plate in FIG. 4.

Referring to FIG. 4, there is shown an optical pickup apparatus according to an embodiment of the present invention. The optical pickup apparatus includes the same constructional elements except that the structure of a polarizing phase plate 34 is different when comparing with the conventional optical pickup apparatus in FIG. 2. Accordingly, a detailed explanation as to the same elements as those in FIG. 2 will be omitted. The optical pickup apparatus of FIG. 4 includes a polarizing phase plate 34 consisting of four phase zones 34a, 34b, 34c and 34d as shown in FIG. 5 to control a position of a sub-beam in accordance with a track pitch of an optical disc 22. The first to fourth phase zones 34a, 34b, 34c and 34d constructing the polarizing phase plate 34 are arranged such that they have a phase difference of 180° with respect to the adjacent phase zones. A first polarized beam in two polarized beam emitted from a light source 12 passes through the polarizing phase plate 34 without a phase modulation and is irradiated on the recording surface of the optical disc 22 as a main beam. A second polarized beam in the beams emitted from the light source 12 is phase-modulated by the four phase zones 34a, 34b, 34c and 34d of the polarizing phase plate 34 and is irradiated on the recording surface of the optical disc 22 as a double-mountain shaped sub-beam. In this case, a distance from the center into the peak of the double-mountain shaped sub-beam formed on the recording surface of the optical disc 22 by means of the polarizing phase plate 34, that is, x value indicating a position of the sub-beam is determined in accordance with the a width(d) of the first and second phase zones 34a and 34b located at the middle portion of the polarizing phase plate 34 as indicated in the following equation:

$$X = f\frac{\lambda}{d} \qquad (2)$$

wherein f represents a focus length of the objective lens and λ does a wavelength of beam. It can be seen from said equation (2) that a position(x) of the sub-beam can be controlled by adjusting a width d of the first and second phase zones 34a and 34b. In other words, the sub-beam can be located at a position suitable for eliminating a crosstalk by controlling a width d of the first and second phase zones 34a and 34b in the polarizing phase plate 34. In this case, a width d of the first and second phase zones 34a and 34b in the polarizing phase plate 34 for forming a sub-beam at a position suitable for eliminating a crosstalk will be described below.

First, assuming that a cross talk component should be optimally eliminated when a twin-mountain of the sub-beam is accurately positioned at tracks adjacent to a track to be accessed, that is, when x value indicating a position of the sub-beam is equal to a track pitch p, widths(d) of the first and second phase segments 34a and 34b in the polarizing phase plate 34 are set to fλ/p according to said equation (2). However, a cross talk component is not always eliminated effectively by the sub-beam only when the sub-beam is accurately located at the adjacent track.

Accordingly, assuming that, when a width d of the first and second phase zones 34a and 34b are k(a certain time constant) times as large as a track pitch p, a crosstalk component should be optimally eliminated, it is desirable that a width d of the first and second phase zones 34a and 34b is set to kfλ/p.

Also, in order to control a position(x) of the sub-beam adaptively in accordance with the track pitch p, a width d of the first and second phase zones 34a and 34b must be set to be smaller than a diameter a of the objective lens. This is caused by a fact that, when a width d of the first and second phase zones 34a and 34b is set to be larger than a diameter a of the objective lens, a position(x) of the sub-beam is determined only by a wavelength(λ) of the beam and the numerical aperture NA of the objective lens independently of the track pitch p like the prior art.

For instance, it is assumed that an optical disc having a track pitch p set to 0.37 μm should be accessed by taking advantage of a beam having a wavelength(λ) of 410 nm and an objective lens having the numerical aperture(NA) of 0.6 and having a focus lengthi(f) set to 3.3 mm. In such an optical pickup apparatus, when it is intended to produce a sub-beam formed accurately on the adjacent track to a track to be accessed by utilizing the polarizing phase plate 34 (i.e., when k=1), a width d of the first and second phase zones 34a and 34b is set to 3.66 mm(i.e., d=kfλ/p=3.3 mm×410 nm/0.37 μm=3.66 mm). In this case, it can be seen from said equation (1) that a diameter a of an objective lens having the numerical aperture(NA) of 0.6 and a focus length of 3.3 mm is about 4 mm(i.e., a=2NA×f=2×0.6×3.3 μmm≈4 mm). As a result, in the optical pickup apparatus according to an embodiment of the present invention, it can be seen that a width (i.e., d=3.67 mm) of the first and second phase zones 34a and 34b is set to be smaller than a diameter (i.e., a=4 mm) of the objective lens. Accordingly, in the optical pickup apparatus according to the present invention, a position(x) of the beam is adaptively adjustable in accordance with the track pitch p by controlling a width d of the first and second phase zones 34a and 34b in the polarizing phase plate 34.

Figure 6:
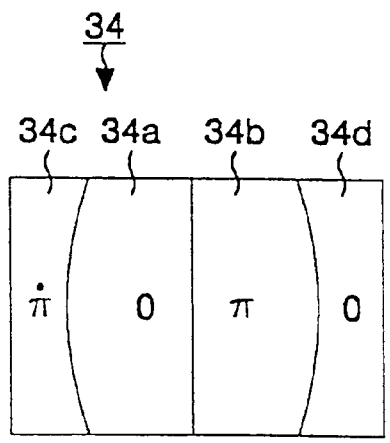
FIG. 6 shows another structure of the polarizing phase plate in FIG. 4.
Figure 7:
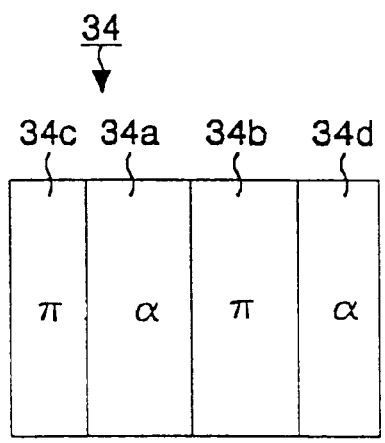
FIG. 7 shows still another structure of the polarizing phase plate in FIG. 4.

Furthermore, the first and second phase zones 34a and 34b arranged at the middle portion of the polarizing phase plate 34 may be provided in the shape of having a desired curvature as shown in FIG. 6. Also, the third and fourth phase zones 34c and 34d arranged at each side of the first and second phase zones 34a and 34b may be provided in such a manner to have a difference of 180° +α adjacent phase zones as shown in FIG. 7. Herein, it is desirable that α has a rage of $-\pi/2 < \alpha < \pi/2$.

Accordingly, the main beam and the sub-beam for eliminating a crosstalk component optimally are irradiated on the recording surface of the optical disc 22, and the main beam and the sub-beam reflected from the recording surface is incident, via the objective lens 20 and the beam splitter 18, to the PBS 20. The PBS 24 separates the reflective light beam received from the beam splitter 18 into a main beam and a sub-beam, and allows them to be incident to the first and second photo detectors 26 and 28, respectively. The first photo detector 26 detects a radio frequency signal including an information signal from the main beam, and the second photo detector 28 detects a crosstalk component in the adjacent track from the sub-beam. The differential amplifier 32 eliminates a crosstalk component output from the second photo detector 28 from the radio frequency signal output from the first photo detector 26 to thereby output an accurate reproduced signal.

As described above, the optical pickup apparatus controls a position of the sub-beam easily in accordance with a track pitch of the optical disc by utilizing a polarizing phase plate consisting of a plurality of phase zones, thereby eliminating a crosstalk component optimally.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An optical pickup apparatus producing a sub-beam for eliminating a cross talk component by utilizing a polarizing phase plate, wherein said polarizing phase plate includes at least two phase zones at each side of the center line thereof, and said at least two phase zones have at least one phase zone which has a width differing from the width of the remaining phase zone or zones.

2. An optical pickup apparatus as claimed in claim 1, wherein the width of two phase zones arranged adjacent to the center line of the polarizing phase plate is determined by the track pitch of the recording media read by said sub-beam.

3. An optical pickup apparatus as claimed in claim 2, wherein said two phase zones arranged at the center of the polarizing phase plate has a predetermined curvature toward the outside thereof.

4. An optical pickup apparatus as claimed in claim 1, wherein said phase zone has a phase difference of 180° from the adjacent phase zones.

5. An optical pickup apparatus as claimed in claim 4, wherein said phase zone arranged at the outside has a phase difference of $180°+\alpha(-\pi/2<\alpha<\pi/2)$ from the adjacent phase zones.

6. An optical pickup apparatus as claimed in claim 1, further comprising:
   a light source for generating a light beam;
   an objective lens for focusing a light beam passing through the polarizing phase plate on an optical disc;
   a photo detector for detecting a light beam reflected from the optical disc; and
   a beam splitter for progressing a light beam from the polarizing phase plate toward the objective lens and for progressing the reflective light beam passing through the objective lens from the optical disc toward the photo detector.

7. An optical pickup apparatus as claimed in claim 6, wherein said photo detector comprises:
   a first photo detector for detecting a main beam reflected from the optical disc; and
   a second photo detector for detecting a sub-beam reflected from the optical disc.

8. An optical pickup apparatus as claimed in claim 7, further comprising:
   a polarizing beam splitter for separating the reflective light beam into the main beam and the sub-beam to progress them into each of the first and second photo detectors; and
   a collimator lens for progressing a light beam from the polarizing phase plate in parallel toward the beam splitter.

9. An optical pickup apparatus as claimed in claim 2, wherein a width of two phase zones arranged at the center line of the polarizing phase plate is set to be smaller than a diameter of the objective lens.

10. An optical pickup apparatus producing a sub-beam for eliminating a cross talk component by utilizing a polarizing phase plate, wherein said polarizing phase plate includes at least two phase zones at each side of the center line thereof, and said at least two phase zones have at least one phase zone which with respect to said center line, has a width differing from the width of the remaining phase zone or zones, and located adjacent to said center line.

* * * * *